United States Patent [19]

Summey

[11] Patent Number: 5,279,346

[45] Date of Patent: Jan. 18, 1994

[54] NON-SKID SNOW CHAIN RAMPS

[76] Inventor: Keith Summey, 2961 SE. Cedar Dr., Hillsboro, Oreg. 97123

[21] Appl. No.: 886,158

[22] Filed: May 21, 1992

[51] Int. Cl.⁵ .............................................. B60C 27/06
[52] U.S. Cl. .................................. 152/213 R; 81/15.8; 254/88
[58] Field of Search ............ 254/88; 152/213 R, 210, 212; 81/15.8; 36/67 D, 134

[56] References Cited

U.S. PATENT DOCUMENTS

| | | | |
|---|---|---|---|
| 2,604,802 | 7/1952 | Rhoads et al. | 81/15.8 |
| 3,756,097 | 9/1973 | Whitlock | 81/15.8 |
| 3,893,500 | 7/1975 | Planz | 152/213 |
| 3,926,239 | 12/1975 | Petersons et al. | 152/210 |
| 3,937,262 | 2/1976 | Lee | 152/210 X |
| 3,937,263 | 2/1976 | Hill et al. | 152/213 |
| 4,031,939 | 6/1977 | DeMartini | 152/213 |
| 4,103,870 | 8/1978 | Murakami | 254/88 |
| 4,194,724 | 3/1980 | Masegian | 254/88 |
| 4,783,913 | 11/1988 | Aoyama | 36/134 |
| 4,875,300 | 10/1989 | Kazz | 36/134 |

Primary Examiner—Michael W. Ball
Assistant Examiner—Francis J. Lorin
Attorney, Agent, or Firm—John S. Ferrell

[57] ABSTRACT

A stackable, non-skid snow chain ramp is disclosed for use in the installation of tire chains on both snowy and icy surfaces. The tire ramp is designed with a grooved top and bottom surface and is operated by laying a pair of the ramps in parallel, spaced the distance equal to the separation of the automobile wheels. Tire chains are then laid over the spaced ramps with the cross links of the chains inserted into spaced chain grooves. The tire is then driven up onto the ramp and brought to rest against a tire block and positioned within a wheel well constructed in the ramp. The chains are then wrapped around the tires and connected in a traditional manner. The bottom surface of the ramps contain a combination of grooves and replaceable spikes for use in both snow and icy surface conditions. The disclosed ramps are designed to permit symmetrical stacking for easy storage and conveyance.

1 Claim, 3 Drawing Sheets

NON-SKID SNOW CHAIN RAMPS

BACKGROUND OF THE INVENTION

1. Field of the Invention

This invention relates to automobile snow chains and more particularly to a device for aiding in the application of snow chains to automobile tires.

2. Description of the Background Art

In U.S. Pat. No. 3,893,500 an apparatus for holding vehicle wheel tire chains is disclosed, incorporating a ramp member for mounting the tire chains onto the wheels.

In U.S. Pat. No. 3,937,263 a tire chain container and mounting aid is disclosed which includes a pair of hollow shells which, when fastened together in open-face-to-open-face relation, form a closed container capable of containing a pair of tire chains.

In U.S. Pat. No. 4,103,870 a tire ramp is disclosed, having a hinged mid-section which closes to form a container for the tire chains.

In U.S. Pat. No. 4,194,724, a wooden block and mechanical alarm bell combination is disclosed, upon which an automobile wheel can climb to facilitate tire chain installation. The warning bell alerts the user when proper tire positioning has been achieved.

One common problem which faces users of tire chain ramps and which is not addressed in the prior art, is the difficulty of fixing the ramp stationary as the driver attempts to back or drive his car up on the tire chain ramp for tire chain installation. Although this problem is not as serious in freshly fallen or powdered snow where the ramp has a tendency to sink into the ground a few inches, tire ramp slippage is particularly severe in packed snow or on icy surfaces. Since many tire chains are installed on highway roadsides, packed or icy conditions are not uncommon. When ice is the condition of the installation surface, a second person is generally required to hold the ramp in place as the driver rolls the tire onto the ramp.

A second problem which is not adequately addressed in the prior art is the problem of storing these tire ramps. Since many tire chain users will be carrying these tire chains in their cars during the winter months, it is desirable for the ramps and chains to take up as small a volume as practically possible. It is also desirable for this volume to be consumed by orthogonal planar surfaces in order to allow for efficient storage of other adjacent items.

What is needed then, is a snow chain installation ramp having a non-skid surface useful both in ice and packed snow and which provides compact storage of both the ramps and the chains.

SUMMARY OF THE INVENTION

In accordance with the present invention, a non-skid snow chain ramp is disclosed having a series of chain grooves for holding the cross links of a snow chain. The ramp has an inclined surface and a wheel well for holding the tire to which the chain is to be applied. The ramp of the present invention has a non-skid bottom surface which prevents slipping of the ramp in ice or packed snow conditions. The ramp is configured in such a way to allow a pair of these ramps to be conveniently stacked for efficient storage of both the ramps and the tire chains.

DESCRIPTION OF THE PREFERRED EMBODIMENT

Figure 1:
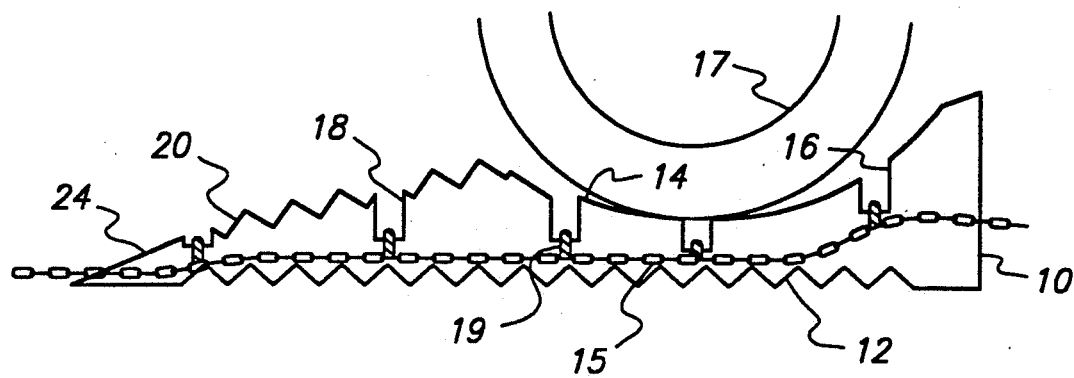
FIG. 1 is a side view in portrait orientation of the preferred embodiment of the snow chain ramp of the present invention.

Referring now to FIG. 1, a stackable, non-skid snow chain ramp is shown in side view useful for the installation of snow tire chains. In order to use the ramps for the intended purpose of assisting in the installation of tire chains, the ramps are placed parallel to each other, separated by the distance of the automobile wheels. Chains are then laid over the ramp and the automobile is driven so that the wheels ascend the ramp in such a way that the chains may then be conveniently installed around the wheels. In FIG. 1, a single ramp 10 is shown in side view having a front edge 24, top surface 20, and wheel well 14. The tire is driven over the front edge 24, up the top surface 20, and comes to rest in the wheel well 14 against tire block 16. Tire chain 15 rests across the top of ramp 10 such that cross links 19 on tire chain 15 fit into chain grooves 18. Once tire 17 is in place, chain 15 can be wrapped around tire 19 and locked in place in a traditional manner. Preferably, ramp 10 has between four and seven chain grooves 18, beginning adjacent to front edge 24 extending across top surface 20, through wheel well 14. Top surface 20 and bottom surface 12 are constructed using grooves and edges in order to improve traction between top surface 20 and wheel 19, and between bottom surface 12 and the ground upon which ramp 10 rests during installation.

Figure 2A:
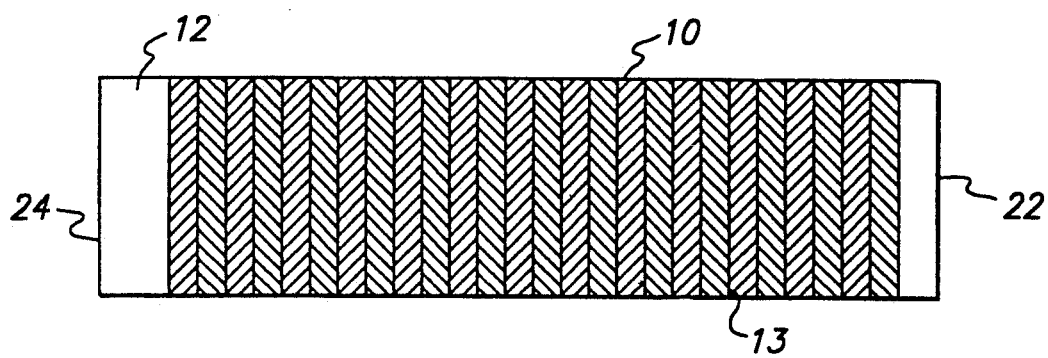
FIG. 2(a) is a bottom view in portrait orientation of the ramp of FIG. 1 showing ridges 13.

Referring now to FIG. 2(a), bottom surface 12 of ramp 10 is shown. A common problem of snow tire ramps is their tendency to slip on snow and ice while the automobile wheel is being driven up onto them. The present invention uses ridges 13 in order to improve traction between the ramp and the ground. The ridges 13 are particularly effective in snow and slushy ground surface conditions. The shape and configuration of 13 ridges are not critical, and various patterns have been found to be useful. One such alternative configuration is a cross-hatched pattern consisting of intersecting ridges.

Figure 2B:
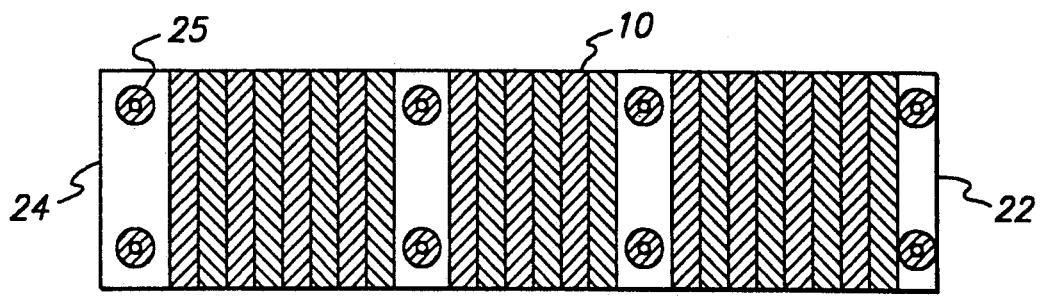
FIG. 2(b) is an alternative embodiment of FIG. 1 in portrait orientation showing ridges 13 and spikes 25.

An alternative embodiment of bottom surface 12 is shown in FIG. 2(b), further comprising spikes constructed of metal or hard material particularly suited for use on icy surfaces. The bottom surface 12 of ramp 10, shown in FIG. 2(b), contains both spikes 25 and ridges 13, allowing ramp 10 to be used on both icy and snowy surfaces. One type of spike 25 which is well suited to the purpose of improving traction on bottom surface 12, is the metal pointed spike commonly used in golf shoes. These golf shoe spikes generally have a plastic threaded base and a metal tip allowing the user to unscrew the spikes for easy replacement. Alternatively the spikes could be constructed of plastic, and molded into bottom surface 12 during fabrication. A third spike type which is particularly convenient consists of a structure which has spikes on both sides. One spike side is pushed into a recess or hole in ramp 10, while the second side protrudes from bottom surface 12. This configuration enables the spike to be easily removed for convenient ramp 10 storage.

Figure 3:
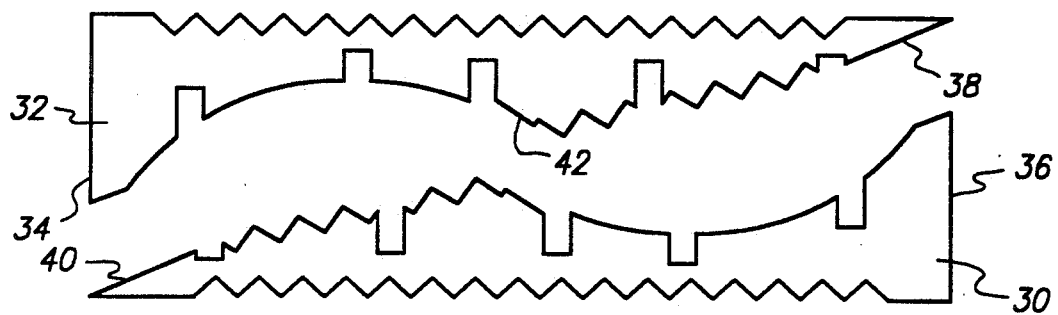
FIG. 3 is a side view in portrait orientation of a pair of ramps 10 stacked top to bottom suitable for storage.

Referring now to FIG. 3, a pair of ramps 10 are shown stacked one on top of the other forming a compact box-like structure promoting easy storage. Bottom ramp 30 is shown connected to top ramp 32 in such a way that top ramp 32 rear edge 34 abuts bottom ramp 30 front edge 40. Also connecting is rear edge 36 of bottom ramp 30 to front edge 38 of top ramp 32. The center points of each of the two ramps also connect at support point 42. In one embodiment, the height of rear edges 36 and 34 are sufficient, that a pair of spaces at either side of support point 42 provide a useful storage area for the chains 15.

Figure 4:
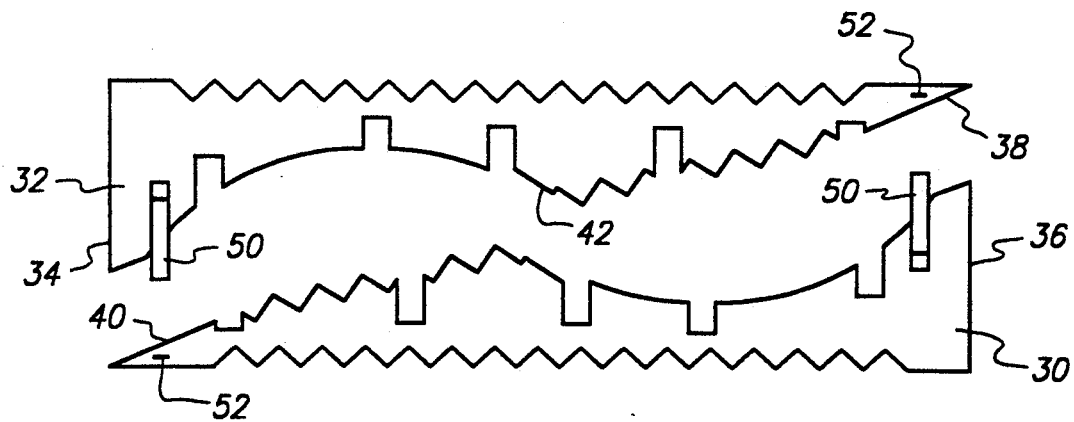
FIG. 4 shows the stacked ramps 10 of FIG. 3 in portrait orientation including latch 50 and catch 52.

Referring now to FIG. 4, the pair of stacked ramps in FIG. 3 are shown additionally comprising latch 50 and catch 52 on both ends of the stacked ramps. This latch and catch configuration enables the two ramps 10 to be secured for storage and transportation.

Figure 5:
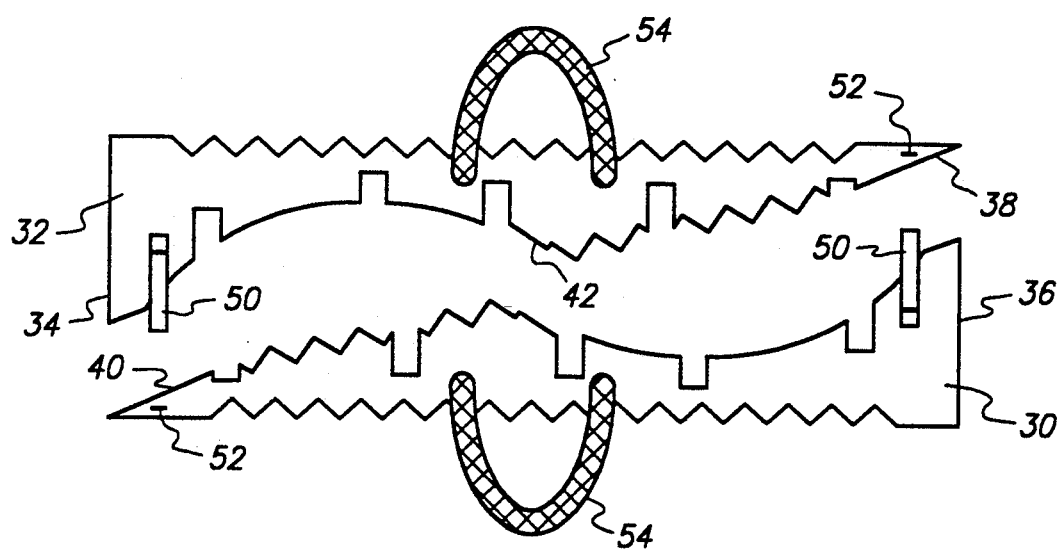
FIG. 5 shows the stacked ramps 10 in portrait orientation of FIG. 4 further comprising handles 54.

Referring now to FIG. 5, a pair of stacked ramps as in FIG. 4 are shown, further comprising handles 54. These handles may be conveniently constructed of nylon or hemp rope and are useful for transporting the ramps 10, and when positioning the ramps for installation.

The invention has now been explained with reference to specific embodiments. Other embodiments will be apparent to those of ordinary skill in the art in light of this disclosure. For example, ramp 10 may be effectively constructed of various materials including wood, plastic, structural foam or other light weight, non-corroding materials. Therefore it is not intended that this invention be limited, except as indicated by the appended claims.

I claim:

1. A non-skid tire chain ramp for use in the installation of snow chains on vehicle wheels comprising:

a bottom surface which rests on the ground and which further comprises grooves and replaceable spikes for holding the bottom surface fast on snow and ice;

a top surface shaped as an incline having a front and rear edge, wherein the surface increases in height from front to rear, for elevating the vehicle wheel onto the ramp;

a wheel well shaped as a semicircular depression located rearwardly along the top surface, for holding the vehicle wheel in place during chain installation;

spaced chain grooves located along the top surface and wheel well for holding tire chain cross-links; and tire block means located adjacent to the rear edge of the top surface and projecting upwardly from the wheel well, for the purpose of acting as a stop for the vehicle wheels as the tire chains are installed on the wheels.

* * * * *